United States Patent [19]
Perez-Mendez

[11] Patent Number: 5,171,996
[45] Date of Patent: Dec. 15, 1992

[54] PARTICLE DETECTOR SPATIAL RESOLUTION

[75] Inventor: Victor Perez-Mendez, Berkeley, Calif.

[73] Assignee: Regents of the University of California, Oakland, Calif.

[21] Appl. No.: 738,529

[22] Filed: Jul. 31, 1991

[51] Int. Cl.[5] .................... G01T 1/20; H01L 25/00; H01L 21/306; B44C 1/22
[52] U.S. Cl. .................. 250/361 R; 156/633; 156/655; 156/657; 156/662; 156/668; 250/370.09; 250/370.11; 427/64
[58] Field of Search .............. 156/633, 634, 655, 656, 156/662, 663, 668, 657; 427/64, 65, 69, 70, 72, 248.1, 255.5; 313/483; 250/361 R, 361 C, 483.1, 484.1, 486.1, 370.09, 370.11

[56] References Cited

U.S. PATENT DOCUMENTS

| | | | |
|---|---|---|---|
| 3,041,456 | 6/1962 | MacLeod | 250/80 |
| 3,825,763 | 7/1974 | Ligtenberg et al. | 250/486 |
| 3,829,728 | 8/1974 | Gudden et al. | 313/101 |
| 4,069,035 | 1/1978 | Lubowski et al. | 427/70 |
| 4,239,791 | 12/1980 | Sonoda et al. | 427/64 |
| 4,490,615 | 12/1984 | Riihimaki et al. | 250/487.1 |
| 4,675,525 | 6/1987 | Amingual et al. | 250/338 |
| 4,712,011 | 12/1987 | Van Leunen | 250/361 |
| 4,842,894 | 6/1989 | Ligtenberg et al. | 427/65 |

FOREIGN PATENT DOCUMENTS 1423935 2/1976 United Kingdom.

OTHER PUBLICATIONS

C. W. Bates, Adv. in Electronics and Electron Physics, vol. 28A (1963) pp. 451-459.
A. L. N. Setvels et al., Philips Research Reports, vol. 29, (1974) pp. 341-352 and 353-362.
H. Washida et al., Adv. in Electronics and Electron Physics, vol. 52 (1979) pp. 201-207.

Primary Examiner—William A. Powell
Attorney, Agent, or Firm—Paul R. Martin; Kathleen S. Moss; Pepi Ross

[57] ABSTRACT

Method and apparatus for producing separated columns of scintillation layer material, for use in detection of X-rays and high energy charged particles with improved spatial resolution. A pattern of ridges or projections is formed on one surface of a substrate layer or in a thin polyimide layer, and the scintillation layer is grown at controlled temperature and growth rate on the ridge-containing material. The scintillation material preferentially forms cylinders or columns, separated by gaps conforming to the pattern of ridges, and these columns direct most of the light produced in the scintillation layer along individual columns for subsequent detection in a photodiode layer. The gaps may be filled with a light-absorbing material to further enhance the spatial resolution of the particle detector.

34 Claims, 5 Drawing Sheets

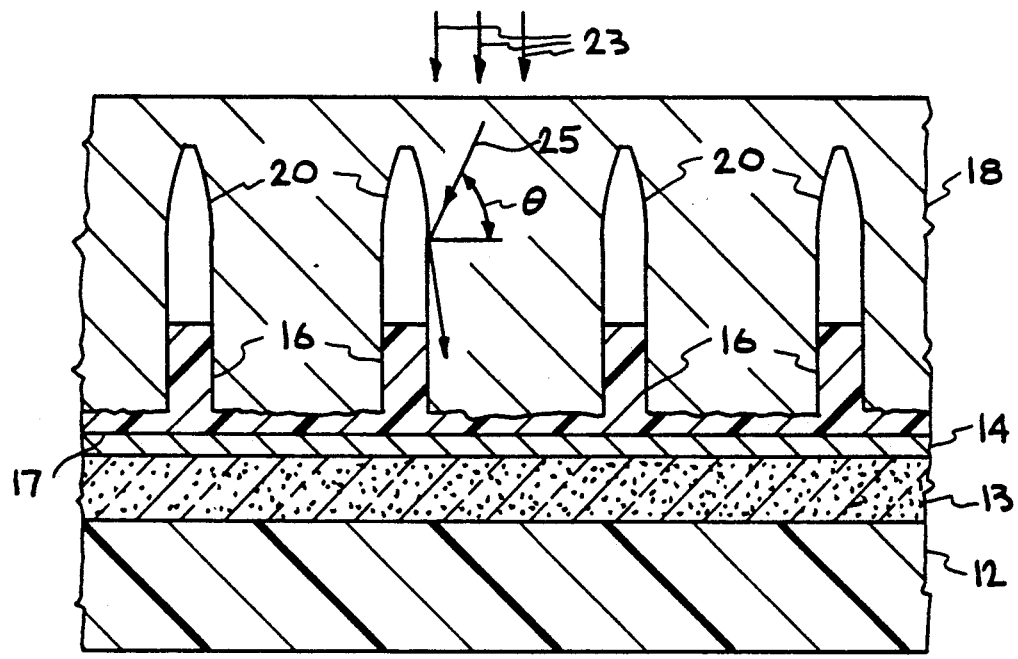
FIG. 3
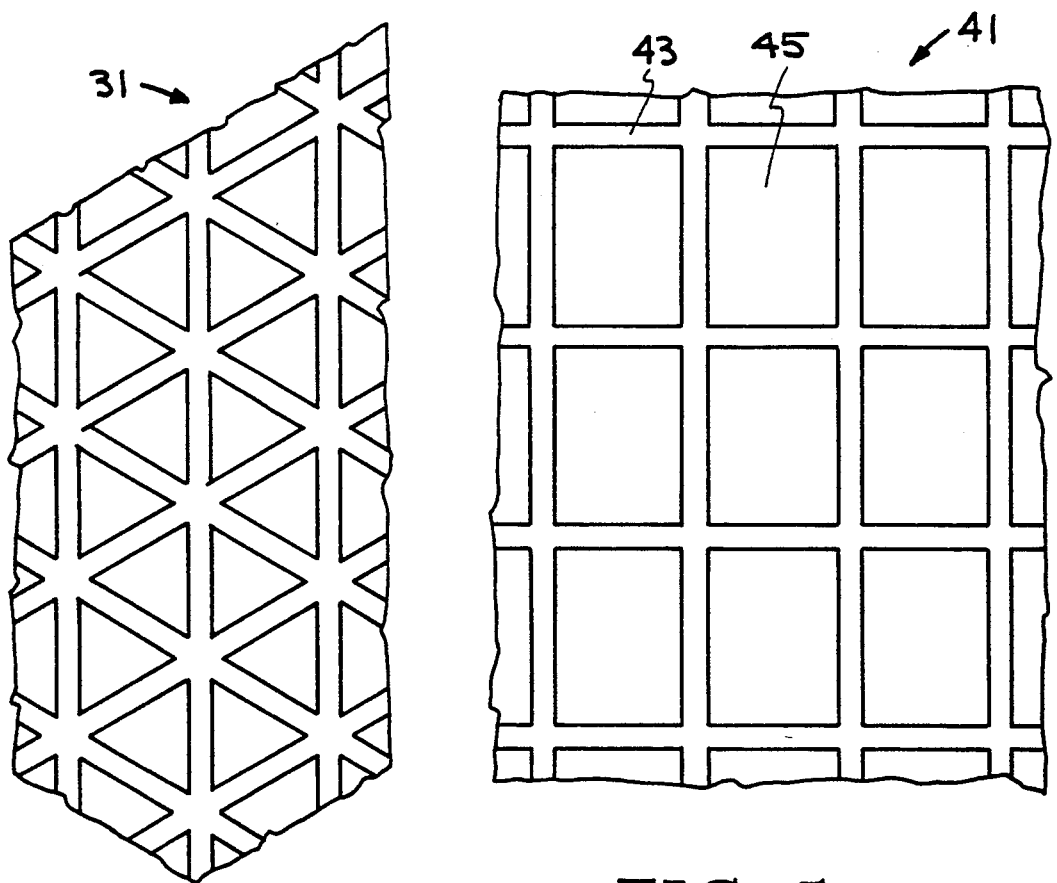
FIG. 4
FIG. 5

PARTICLE DETECTOR SPATIAL RESOLUTION

This invention was made with Government support under Contract No. DE-AC03-76SF00098 between the U.S. Department of Energy and the University of California for the operation of the Lawrence Berkeley Laboratory. The Government has certain rights in this invention.

FIELD OF THE INVENTION

This invention relates to improvements in spatial resolution in particle detectors, and more particularly to a luminescent layer in a particle detector.

BACKGROUND OF THE INVENTION

A luminescent material, such as cesium iodide (CsI), potassium iodide (KI), rubidium iodide (RbI), gallium selenide ($Ga_ySe$), gadolinium oxysulphate ($Gd_2O_2S$), lanthanum oxysulphate ($La_2O_2S$), cadmium sulphide (CdS), zinc cadmium sulphide ($Zn_xCd_{1-x}S$), cadmium tungstate ($CdWO_3$), or lead oxide ($PbO_z$), will receive incident charged particles or photons of high kinetic energy and convert part or all of this kinetic energy to one or a plurality of photons of individual energies lying in the range 1-4 eV. The electromagnetic radiation emitted by the luminescent material is not wholly directed in a single forward direction, but is emitted in all directions, although not isotropically. Preferably, most or all of this radiation should propagate in approximately the forward direction, toward a photodiode layer that will provide an electrical signal indicating arrival of the incident high energy charged particles or photons. For this reason, many workers have attempted to promote forward direction emission of photons by the light-emitting atoms or molecules contained in the luminescent material.

One early approach to compartmentalization of radiation produced in a luminescent layer is disclosed by MacLeod in U.S. Pat. No. 3,041,456, where thin walls, running in two orthogonal directions, of optically transparent material are provided between thin adjacent layers or rectangular parallelepipeds of luminescent material.

Another early approach, disclosed by Ligtenberg et al in U.S. Pat. No. 3,825,763, provides a substrate of glass or metal (e.g., Al or Ti), on which a thin scintillation layer of CsI or $Z_xCd_{1-x}S$ is deposited of unspecified thickness. A separation layer of $Al_2O_3$ is deposited on an exposed surface of the scintillation layer, and a photocathode layer of $Cs_2Sb$ or similar material is deposited on an exposed surface of the separation layer. The substrate material and the scintillation material have respective thermal expansion coefficients of $2-2.5 \times 10^{-5}/°C.$, respectively, and the substrate is maintained at an elevated temperature $T = 150°-200°$ C. when the scintillation material is deposited thereon. The substrate-scintillation layer combination is then cooled to room temperature, and cracks develop in the thin scintillation layer as cooling proceeds. These cracks produce columns of scintillation material, separated by small air or vacuum gaps between adjacent columns and extending approximately perpendicularly to the substrate-scintillation layer interface. The crack structure thereby produced has a random collection of shapes and associated diameters.

Gudden et al, in U.S. Pat. No. 3,829,378, disclose use of a luminescent layer on a screen with an absorbing substance deposited thereon whose absorption decreases as position varies from the center toward the edges of the screen. This invention partly compensates for the tendency of screen brightness to decrease as one approaches an edge of the screen.

A process for making columnar structures of a luminescent layer on an X-ray screen is disclosed in U.S. Pat. No. 4,069,355 by Lubowski et al. Depressions or valleys are etched at regular intervals in an underlying substrate, and the luminescent material is grown only on the raised portions of the substrate. The gaps between adjacent columns of luminescent material are filled with a highly reflecting material or with another luminescent material.

Sonoda, in U.S. Pat. No. 4,239,791, discloses a method for making a screen image intensifier. A heated phosphorescent material layer is treated with a colder liquid material, such as acetone, to cause differential thermal contraction and form a plurality of elongated cracks in this layer running approximately perpendicular to the substrate-phosphorescent layer interface. These cracks are asserted to form optically independent columns of phosphorescent material.

Riihimaki et al disclose an X-ray intensifying screen with a luminescent layer formed, in an unspecified manner, with a plurality of regularly spaced grooves therein to capture and guide light produced in the luminescent layer. The grooves run in one direction only, and it is unclear how light is channelled within the air or vacuum gaps (with refractive index = 1) between the luminescent material (with refractive index > 1).

Van Leunen, in U.S. Pat. No. 4,712,011, discloses use of the columnar structure produced by the Ligtenberg, et al, invention, and deposits an X-ray-absorbing material in the air/vacuum gaps to absorb X-ray light incident on a gap. Up to five percent of the weight of the scintillation layer may be X-ray-absorbing material deposited in the gaps, but no method of depositing the X-ray absorbing material is discussed.

A method for vapor deposition of a luminescent layer on a screen for image intensification is disclosed by Ligtenberg et al in U.S. Pat. No. 4,842,894. The vapor deposition crucible is positioned at about 20° relative to the normal to the screen, and gaps formed between columns of the luminescent material appear to be elongated bubbles of unspecified material (possibly air or a vacuum). The luminescent material apparently forms predominantly crystalline columns of this material.

Bates, in Advances in Electronics and Electron Physics, vol. 28A (1969) pp. 451-459, discloses use of crystalline CsI and thermally-induced cracking of a contiguous substrate, with crack diameter about 0.5 $\mu m$. It is unclear whether the subsequently grown CsI forms into spaced apart columns as a result of presence of the substrate cracks.

Stevels and Schrama-dePauw discuss some characteristics of vapor deposited CsI, activated with Na, in Philips Research Reports, vol. 29 (1974) pp. 341-352 and 353-362. Cracks are thermally induced in a substrate, held at a temperature of $T = 50°-300°$ C., and a thick or thin CsI(Na) layer is subsequently grown on a cracked surface of the substrate. Stevels et al discuss the effects of heat treatment, thick versus thin CsI layers, the substrate material (KI, RbI or other) and average diameter of the cracks on columns of CsI that form on the substrate surface. The possibility of light channeling in such columns is discussed.

An X-ray image intensifier, using CsI material formed into irregular columns by a cracked mosaic pattern on a substrate, is disclosed by Washida and Sonoda in *Advances in Electronics and Electron Physics*, vol. 52 (1979) pp. 201-207. The possibility of X-ray channeling is discussed, and two types of column spacings are discussed. Maximum improvement of X-ray intensity, relative to use of a conventional, non-columnar luminescent material, appears to be about 40 percent.

British Patent No. 1,423,935, issued to Philips Electronics and Associated Industries, Ltd., discloses provision of a mosaic crack structure in the form of circles, hexagons and rectangles on a substrate surface. Cesium iodide or a similar luminescent material is subsequently vapor deposited on this surface. It is unclear whether spaced apart columns of this vapor deposited material form as a result of the mosiac crack structure.

Most or all of the work discussed above relies upon an irregular mosaic crack structure, formed by thermal mismatch or a similar process, to provide formation of columns, if any, of a deposited luminescent material. Little or no regularity or control is available for parameters such as column diameters, spacing of adjacent columns, or the tendency of such columns to coalesce if the luminescent material that provides control of these parameters and allows flexibility in formation of such structures.

SUMMARY OF THE INVENTION

These needs are met by the invention, which provides one or more methods for fabricating a sequence of columns of regular, controllable geometry and diameter perpendicular to the interface of the luminescent material with an adjacent material. These columns are separated by gaps that may be evacuate or filled with air, with a light-absorbing material, or with a light-producing or light-reflecting substance. In one embodiment, a thin layer of polyimide or other suitable etchable material is deposited on a substrate structure and a sequence of ridges or projections is etched in the polyimide material in a predetermined geometrical structure. A luminescent material is slowly grown (rate $\leq 250$ μm/hr) on the ridge-containing surface to produce a plurality of columns separated by gaps in one or two dimensions. The width of a ridge is varied according to the height of the luminescent layer to be grown so that the columns do not coalsece. Alternatively, the ridges may be etched directly into a substrate material, such as glass, plastic, metal or amorphous or crystalline silicon or germanium. In a third embodiment, the structure is put together as a "sandwich" of a first set of layers containing a photodiode layer and a second set of layers containing a luminescent layer. The columnar structure thus produced reduces by about 58 percent the optical spread factor associated with light produced by conversion in the luminescent material, in one embodiment.

BRIEF DESCRIPTION OF THE DRAWINGS

FIGS. 2 and 3 are sectional side views illustrating the columns formed in the luminescent layer in FIG. 1.

FIGS. 4, 5, 6, 7 and 8 are schematic top views of triangular, rectangular, hexagonal, ovular and linear ridge patterns constructed on an underlayer according to the invention.

DESCRIPTION OF THE INVENTION

Figure 1:
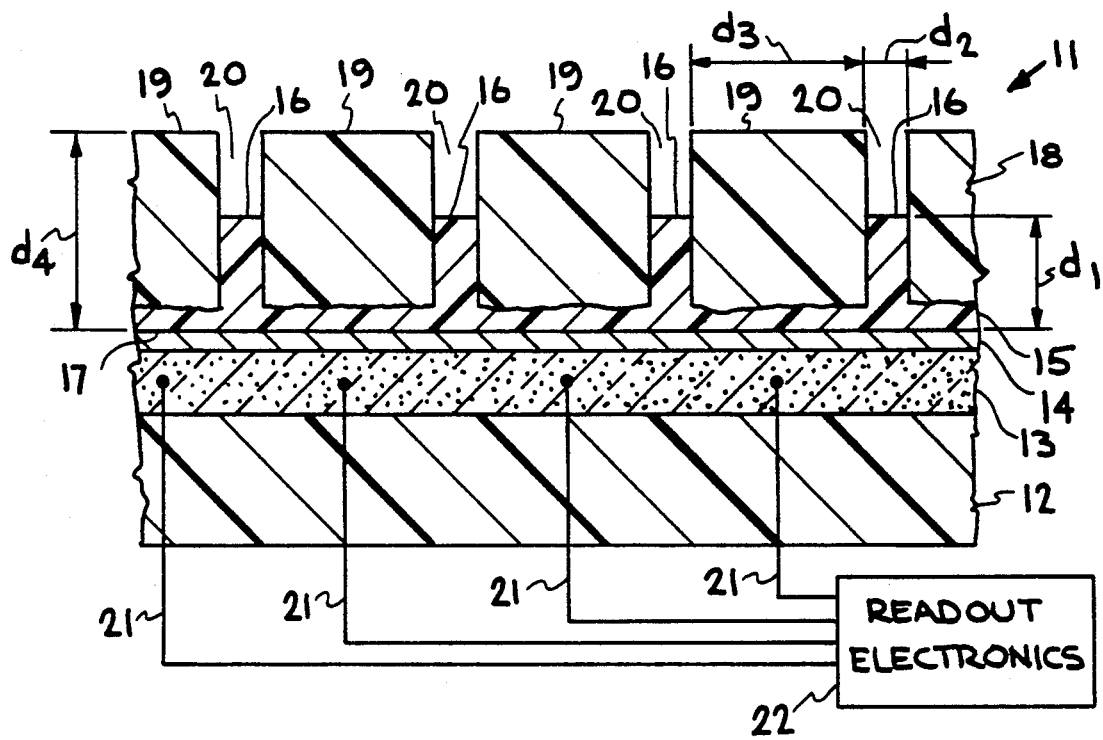
FIG. 1 is a sectional side view of one embodiment of apparatus constructed according to the invention.

In a first embodiment 11 of the invention, shown in FIG. 1, a substrate 12 is provided on which a photodiode layer 13 is deposited on one substrate surface. The substrate material may be glass, plastic, a ceramic, a thin metal layer such as Al or Ti, or crystalline or amorphous silicon or germanium, and the photodiode material is preferably a hydrogenated amorphous column IV semiconductor material such as a-Si:H or a-Ge:H. A transparent, electrically conductive, thin layer 14 (not drawn to scale) of material such as indium-tin-oxide ("ITO"), tin-oxide ("TO"), or another suitable thin metal film is then deposited on an exposed surface of the photodiode layer 13 with a thickness of 1-100 nanometers (nm). The conductive layer 14 is at least partly optically transparent and allows passage of electromagnetic radiation (photons) of appropriate wavelengths between a luminescent layer positioned on one side of the conductive layer and a photodiode layer 13 positioned on the other side of the conductive layer. The photodiode layer 13 and conductive layer 14 are contiguous here. The substrate layer 12 may have any appropriate thickness, and the photodiode layer 13 may have a thickness of 1-10 μm or 10-100 μm for amorphous semiconductor material (e.g., a-Si:H or a-Ge:H) or crystalline semiconductor material (e.g., c-Si or c-Ge), respectively. The photodiode layer 13 has a plurality of electrical traces 21 connected at one end to this layer at regular intervals, and these traces are connected at their second ends to readout electronics 22 that receives signals generated within the photodiode layer.

A pattern layer 15 of etchable pattern material 15, such as polyimide resin, $SiO_2$, or metals such as Al, Cr, Au, Ag, Pd or Pt, of thickness d=5-20 μm, is then deposited on an exposed surface of the conductive layer 14 as shown. Portions of the pattern layer 15 are etched to produce a one-dimensional or two-dimensional sequence of regularly spaced ridges 16 of the pattern material that project approximately perpendicularly to the interface or surface 17 between the conductive layer 14 and the pattern layer. The ridges 16 have height $\approx d_1$, lateral thickness or width $\approx d_2$, and are spaced apart from adjacent ridges by a distance $\approx d_3$. In a preferred embodiment, these lengths are $d_1 = 5-20$ μm, $d_2 = 2-20$ μm, and $d_3 = 10-100$ μm. The "pitch" of this pattern of ridges, $p = d_2 + d_3$, may vary from 15 μm to 110 μm. In the etching of the etchable pattern material 15, a small portion of this material may be allowed to remain at the interface 17, as shown in FIG. 1; or the etchable pattern material 15 may be removed down to the interface 17, except for the ridges 16. In this latter situation, the interface 17 might be covered with a thin layer (not shown in FIG. 1) of an etch stop material, such as a native oxide or silicon nitride, in a manner well known to workers in this art.

The structure is then heated to a low temperature T = 50°-400° C. (preferably, T = 100°-250° C.), and a luminescent layer 18 of luminescent material, such as CsI, KI, RbI, CdS, $CdWO_3$, $Zn_xCd_{1-x}S$, $Ga_ySe$, Gd$_2$O$_2$S, La$_2$O$_2$S, PbO$_z$ or other suitable luminescent material, is grown slowly by evaporation at a growth rate $\leq 500$ μm/hr (preferably $\leq 250$ μm/hr) over the interface 17 and ridges 16, to a height $d_4 \approx 100$–1,000 μm. This evaporation process produces a sequence of cylinders or columns 19 of the luminescent material, separated by air or vacuum gaps 20 of diameter $d_{gap} < d_2$ because of the presence of the ridges 16 of lateral thickness $d_2$. Use of a low growth rate improves adhesion and light emission efficiency of the luminescent material. Certain of the luminescent materials may be activated with Na (CsI), with Tl (CsI), or with a rare earth such as Ce, Pr, Nd or one of the other 11 rare earth elements (Gd$_2$O$_2$S).

Figure 2:
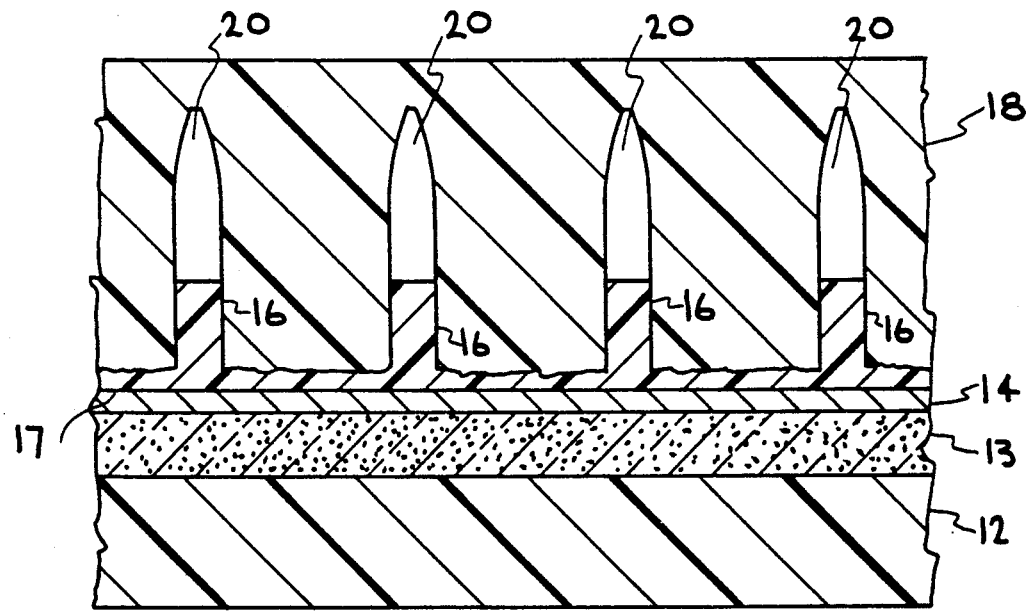
Figure 6:
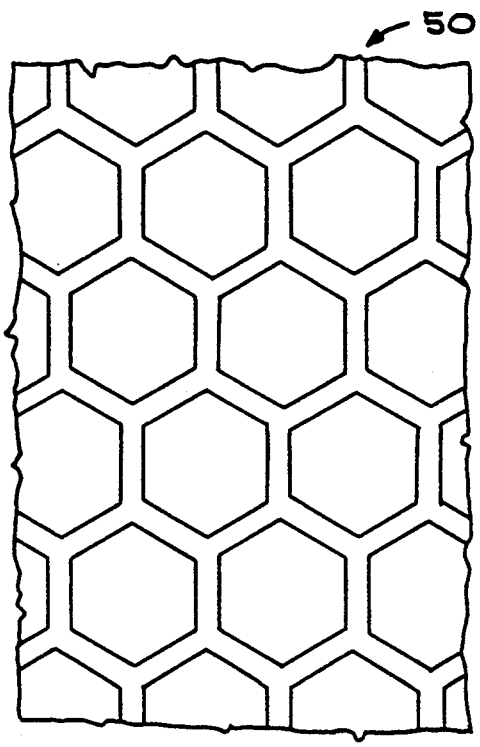
Figure 7:
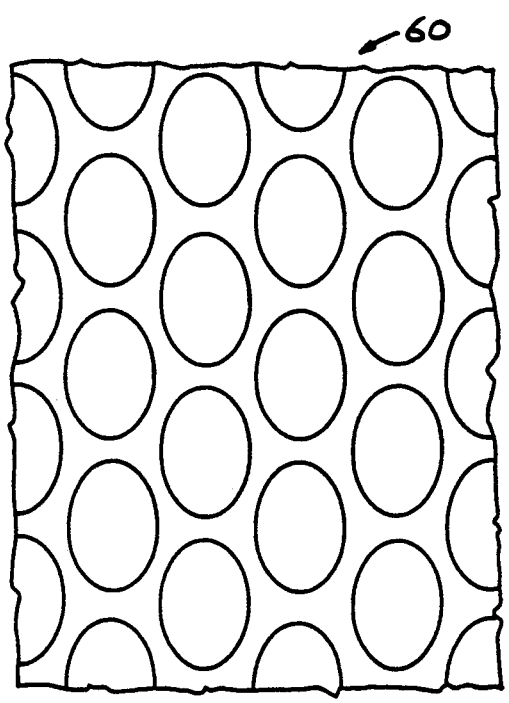
Figure 8:
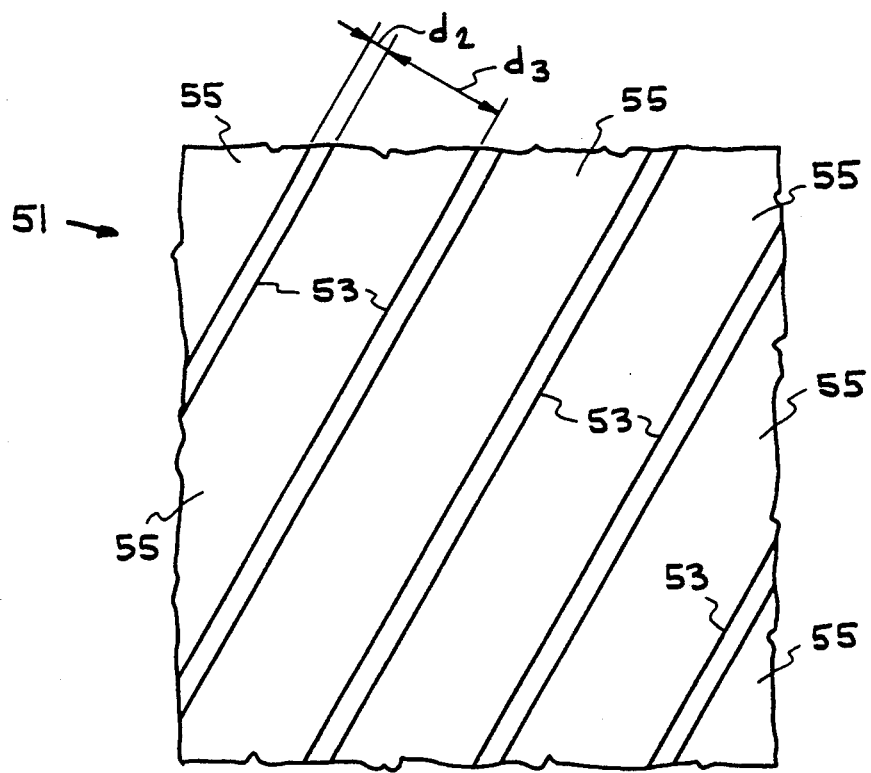

If the thickness $d_4$ of the luminescent layer 18 is made sufficiently large, it is possible that adjacent columns 19 will coalesce in an upper part of the layer 18, although the columns 19 will be well separated from one another in the lower part of this structure. This is illustrated schematically in FIG. 2. However, if the luminescent layer thickness $d_4$ is kept sufficiently small (say, $d_4 \leq 1,000$ μm) and the evaporation rate for the luminescent layer 18 is kept small enough, the resulting luminescent layer should consist of columns 19 of luminescent material that are completely separated from one another. For example, a ridge that is $d_2 = 8$ μm wide will produce a gap between two adjacent columns of CsI material that does not close until the heights of the two adjacent columns reaches about 450 μm. This effect scales approximately linearly with width $d_2$ of the ridge. Thus, if ridges of lateral width $d_2$ are grown, the thickness $d_4$ of the luminescent layer should preferably be no more than 50 $d_2$ in order to avoid gap closure. However, luminescent layers of thicknesses $d_4 = 70\ d_2$, or even $d_4 = 100\ d_2$, prepared according to the invention, will provide improved spatial resolution for particle detection. Thus, a ridge of width $d_2 = 20$ μm is predicted to produce a gap between two adjacent columns of CsI that does not close for a column height $d_4 = 1,000$ μm. The other luminescent materials mentioned above are believed to behave qualitatively similarly so that the minimum height required for gap closure scales approximately linearly with ridge width $d_2$.

As illustrated in FIG. 3, energetic particles 23 (high energy photons or massive charged particles) that are incident upon the embodiment 11 (FIG. 1) first encounter the luminescent layer 18, and all or a portion of the kinetic energy of these particles is converted to electromagnetic radiation or photons 25, of wavelength $\lambda_0$ lying in the range 0.3 μm $\leq \lambda_0 \leq$ 0.7 μm, emitted by the luminescent material. A photon 25 will propagate generally toward the interface 17 (FIG. 1) and will encounter and/or be reflected from the wall of the column in which that photon was originally produced. If the incidence angle $\theta$ of the photon 23 relative to a local tangent to the column wall is sufficiently large ($\csc\theta \geq \csc\theta_{cr} = n_L =$ refractive index of luminescent material at that wavelength), the photon 25 will undergo total internal reflection and will remain within and propagate within the column in which the photon was originally produced by kinetic energy conversion. If the conversion radiation is assumed to be emitted isotropically by the luminescent material, the trapped fraction $f_T$ of this emitted radiation that undergoes total internal reflection in the forward direction from a column wall is determined to be $$f_T = \int_O^{\theta_{cr}} 2\pi\sin\theta d\theta / \int_O^{\pi} 2\pi\sin\theta d\theta = (1 - 1/n_L)/2. \quad (1)$$

Table 1 presents the refractive indices and trapped fractions $f_T$ for some luminescent materials of interest. Although the fraction $f_T$ is less than 0.5, the fact that much of this radiation stays within the column in which it is produced enhances the spatial resolution of the particle detector constructed according to the embodiment 11 in FIG. 1. This trapped fraction $f_T$ is approximately independent of the height of a column.

TABLE 1

| Refractive Index and Trapping Fraction for Luminescent Material Columns | | |
|---|---|---|
| Luminescent Material | Refractive Index | $f_T$ |
| CsI | 1.78 | 0.22 |
| KI | 1.68 | 0.20 |
| RbI | 1.65 | 0.20 |
| CdS | 2.51 | 0.30 |
| Zn$_x$Cd$_{1-x}$S | 2.36 (est.) | 0.29 |
| La$_2$O$_2$S | 1.56 | 0.18 |
| PbO$_z$ | 2.3 (est.) | 0.18 |

FIGS. 4, 5, 6, 7 and 8 are schematic top views of triangular, rectangular, hexagonal, ovular (or circular) and "linear" arrays that provide suitable one-dimensional and two-dimensional ridge patterns for the etchable material 15 used in the embodiment 11 in FIG. 1. The linear array 51 shown in FIG. 8 produces a sequence of parallel blocks or columns extending above the regions 55 and separated by gaps defined by the ridges 53. More generally, an array of closed polygonal ridges may be provided to define and promote initial formation of the columns and separating gaps.

Figure 9:
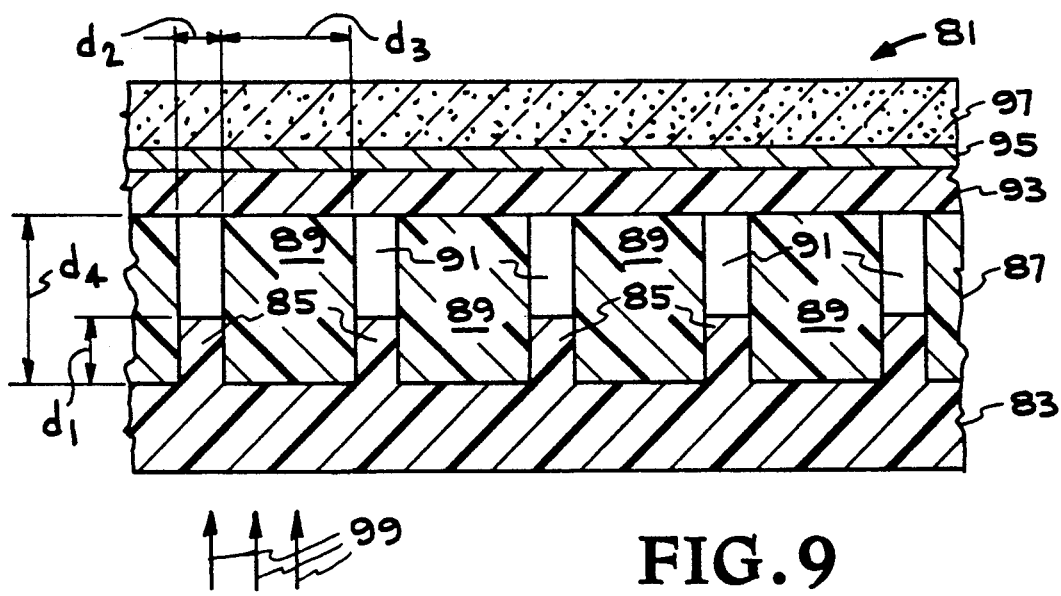
FIG. 9 is a sectional side view of a second embodiment of the apparatus constructed according to the invention.

FIG. 9 illustrates a second embodiment 81 of the invention, in which the order of some of the layers is reversed. A substrate layer 83 is patterned and etched to provide a sequence of ridges 85 of the substrate material extending approximately perpendicularly to the adjacent surface of the substrate. As before, the substrate layer material may be glass, plastic, thin metal, or crystalline or amorphous silicon or germanium. Alternatively, a thin polyimide layer 84 may be deposited on the exposed surface of the substrate 83 and used for ridge formation by etching. A luminescent layer 87, containing luminescent material such as CsI, KI, RbI, CdS, Zn$_x$Cd$_{1-x}$S, CdWO$_3$, Ga$_y$Se, Gd$_2$O$_2$S, La$_2$O$_2$S or PbO$_z$, with or without any of the activators mentioned above, is then slowly evaporated over the substrate 83 patterned with the ridges 85, with the substrate temperature T being held relatively low at T = 100°–250° C. The luminescent material forms into a plurality of columns 89 that are separated by a sequence of air or vacuum gaps 91 defined by the ridges 85 as in FIG. 1. A sealant layer 93 of polyimide or similar materials is deposited over the luminescent layer 87, and an optically transparent conductive layer 95 of ITO or TO is then deposited over the sealant layer 93. Finally, a photodiode layer 97 of a-Si:H, a-Ge:H or mixture thereof is deposited over the conductive layer. The dimensions $d_1$, $d_2$, $d_3$ and $d_4$ of the ridges 85 and luminescent layer 87 are as in FIG. 1. The sealant layer 93, the conductive layer 95 and the photodiode layer 97 have preferred thicknesses in the respective ranges 5–10 μm, 1–100 nm, and 1–10 μm (or 10–100 μm), respectively. Energetic particles 99 are incident upon the structure 81 and will pass through the luminescent layer 87 before passing through the photodiode layer 97.

Figure 10A:
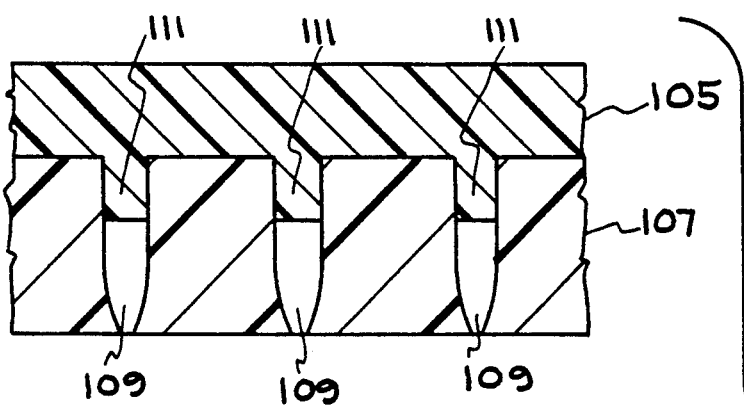
FIGS. 10A and 10B are sectional views illustrating a third embodiment of the invention.
Figure 10A:
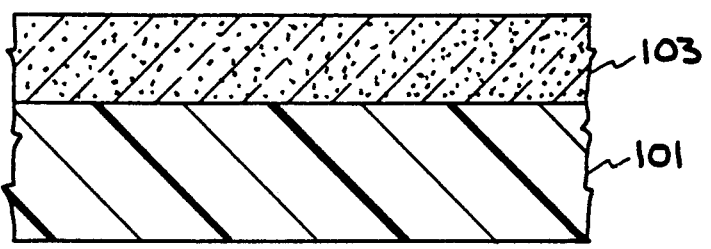
Figure 10B:
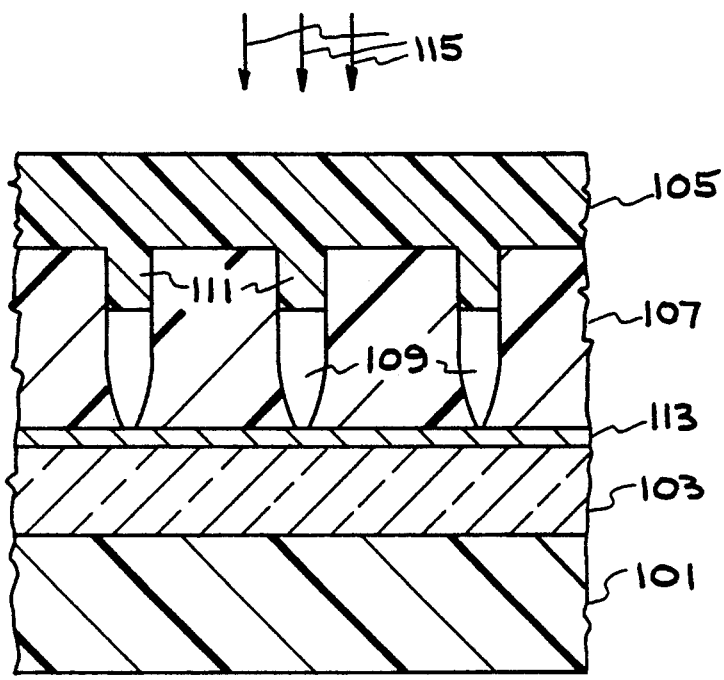

FIG. 10A illustrate a third embodiment of the invention, which is initially constructed as two separate sets of layers. The first set of layers includes a substrate 101, of arbitrary thickness, with a photodiode layer 103 of a-Si:H, a-Ge:H (or a combination thereof), c-Si or c-Ge deposited on the first substrate 101. As in the other two embodiments, the thickness of the photodiode layer may be 1–10 $\mu$m for amorphous Si or Ge and 10–100 $\mu$m for crystalline Si or Ge. The second set of layers includes a second substrate 105, on which is deposited a luminescent layer including a plurality of cylinders or columns 107 of luminescent material, such as CsI, KI, RbI, CdS, $Zn_xCd_{1-x}S$, $CdWO_3$, $Ga_ySe$, $Gd_2O_2S$, $La_2O_2S$ or $PbO_z$,. The columns 107 are separated by a plurality of one-dimensional or two-dimensional gaps 109 that are initially formed using ridges 111. The ridges 111 are in turn formed as in the first or second embodiments, by etching polyimide or another suitable etchable material or by etching the underlying substrate 105. In FIG. 10B, the first and second set of layers are brought together as a "sandwich" and are, optionally, held together using a suitable "glue", such as optical grease, Canadian balsam or other suitable material that produces no effluents when this material cures and hardens. The assembled apparatus, as shown in FIG. 10B with the associated electronics 113, then functions as a particle detector with improved spatial resolution. One advantage of this third embodiment is that the first and second sets of layers may be fabricated independently. If a high temperature is needed to fabricate the columnar luminescent layer 107, the photodiode layer 103 is fabricated separately and is not subjected to this high temperature. Readout electronics is also present, but not shown, in FIGS. 2, 3, 9 and 10B.

Example. The following procedure is preferred for producing a ridge pattern in a polyimide layer. The substrate used should be rinsed in de-ionized water at a temperature of T=180° C. for a time interval $\Delta t = 3-10$ minutes. Polyimide material, such as DuPont PI 2555, is spun on an exposed surface of the substrate at a rotation rate of about 3500 rpm for a time interval $\Delta t = 30$ sec, or for a time sufficient to produce a polyimide layer of an approximate thickness of 3.5 $\mu$m. Alternatively, DuPont PI 2722 material, which contains both the polyimide and a photoresist material, may be used in place of the PI 2555 material. The substrate-polyimide layer combination is then softbaked for about 3 min at a temperature T=90° C. Photoresist, such as KTI 820, is then spun on top of the polyimide layer at a rotation speed of about 3500 rpm for a time interval $\Delta t = 30$ sec, or for a time sufficient to produce a photoresist thickness of 2.5–3.4 $\mu$m. The substrate-polyimide layer-photoresist layer is then softbaked for 2 min. at a temperature T=120° C. The photoresist is then exposed to ultraviolet radiation in the desired pattern for about 15 sec, using photolithography equipment and procedures known in the art. The irradiated photoresist is then baked for about 60 sec. and is developed. The photoresist is immersed in a suitable developer, such as Kodak 934, for about 120 sec., then rinsed and dried. The polyimide is etched simultaneously when the photoresist is developed. The resulting ridge structure is then hardbaked or cured for at least one hour at a temperature of T=280° C., or for one half hour at T=350° C. The scintillation layer material is then coated on the ridge structure to the desired thickness $d_4 = 100-1,000$ $\mu$m, using a low evaporation rate to allow columns of scintillation material to form in conformity to the ridge pattern provided.

Figure 11:
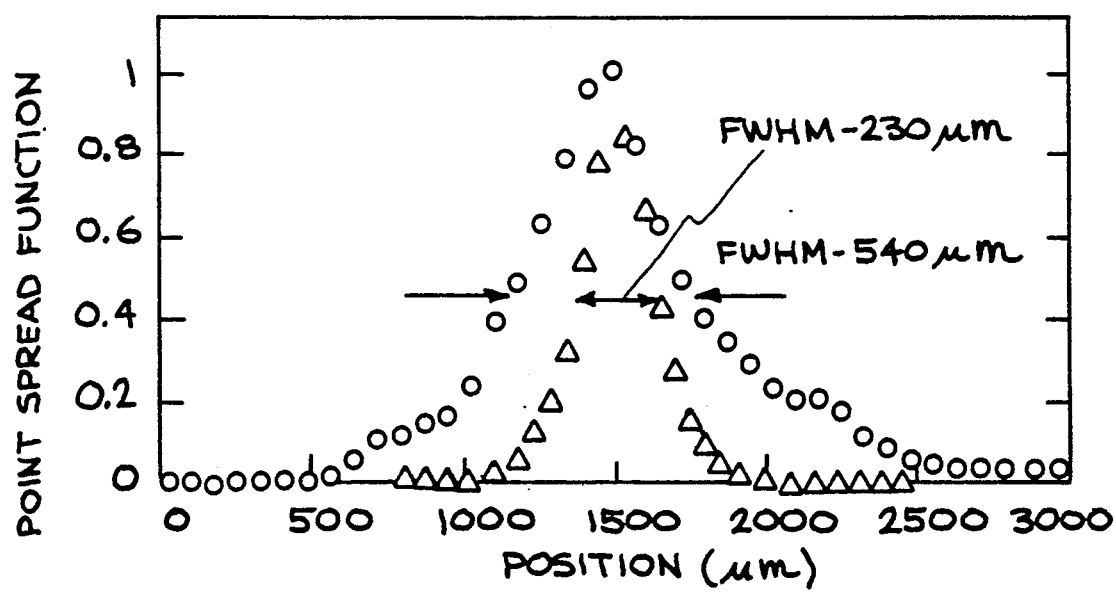
FIG. 11 is a graphical view illustrating a measure of the improvement in spatial resolution where the invention is used for X-ray and charged particle detection.

FIG. 11 is a graphical view illustrating the improvement in spatial resolution, using the invention in one embodiment. The solid circles represent intensity of light received through a conventional, unstructured layer of CsI of thickness 450 $\mu$m with an a-Si:H photodiode layer and have an associated FWHM of 540 $\mu$m about a selected central position at x=1,500 $\mu$m. The triangles represent intensity of light received through a columnar structure of 450 $\mu$m thick CsI, fabricated according to the invention, with an a-Si:H photodiode layer in the same configuration. Here, the FWHM is 230 $\mu$m, a reduction of about 58 percent in the point spread width in one dimension; in two dimensions, the point spread width reduction is estimated to be about 72 percent. A particle detector constructed using the invention disclosed here may resolve lateral spatial separations as small as 10–50 $\mu$m.

The gaps 20 or 91 or 109 in FIGS. 1, 2, 9 or 10A/10B may be filled, by capillary action or otherwise, with a light-absorbing material, such as Te, Sb or Sn (useful for CsI), to reduce the point spread factor associated with light produced in a luminescent layer column fabricated according to the invention. Using this embodiment, most of the light that is not internally reflected within a given column is absorbed by the material in an adjacent gap and does not appear in another such column. This will reduce the total amount of light produced and transmitted by the luminescent layer but will improve the spatial resolution by ensuring that substantially all light produced in a given column of luminescent material will either be absorbed or will propagate within that column to the photodiode layer, where associated readout electronics 22 (FIG. 1) detects which column of luminescent material produced the material. The absorbing material used here should have an optical absorption edge that reaches its maximum near, but below, the range of wavelengths produced by the luminescent material.

I claim:

1. A method of producing a detector of X-rays and high energy charged particles with improved spatial resolution, the method comprising the steps of:

providing a substrate layer of material with an electrically conductive surface;

forming a particle detector layer containing a-Si:H or a-Ge:H on the conductive surface of the substrate layer;

forming a conductive layer of electrically conductive material that is at least partly transparent to incident light having a wavelength $\lambda$ in the range 0.3 $\mu$m $\leq \lambda \leq$ 0.7 $\mu$m, adjacent to the particle detector layer so that the particle detector layer lies between the substrate layer and the conductive layer;

forming a pattern formation layer, having at least a predetermined minimum thickness and containing an etchable material, adjacent to the conductive layer so that the conductive layer lies between the particle detector layer and the pattern formation layer;

etching a predetermined pattern in the pattern formation layer so that the etchable material forms a plurality of ridges or projections, of lateral width d, on an exposed surface of the pattern formation layer; and forming a scintillation layer, at a growth rate ≦500 μm per hour, at a temperature T in the range 50° C.≦T≦400° C., and of thickness no more than 100 d, of scintillation material that produces light of wavelength in the range 0.3–0.7 μm in response to receipt of high energy particles thereat, whereby the scintillation material forms as cylinders or columns, separated by gaps that conform to the predetermined pattern.

2. The method of claim 1, further comprising the step of choosing said scintillation layer material from the class consisting of CsI, KI, RbI, CdS, $Zn_xCd_{1-x}S$, $Gd_2O_2S$, $La_2O_2S$, $Ga_ySe$, $CdWO_3$ and $PbO_z$.

3. The method of claim 1, further comprising the step of choosing said conductive layer material from the class consisting of ITO, TO, Al, Cr, Au, Ag Pd and Pt.

4. The method of claim 1, further comprising the step of choosing said pattern formation layer material from the class consisting of polyimide, amorphous silicon, crystalline silicon, amorphous germanium or crystalline germanium.

5. The method of claim 4, further comprising the step of choosing said predetermined pattern for said pattern formation layer from the class consisting of a triangle, a quadrilateral, a hexagon, an oval and a linear array pattern.

6. The method of claim 1, further comprising the step of filling said gaps between said columns with a material that is highly absorbing for light of said wavelength $\lambda_0$.

7. The method of claim 1, further comprising the step of choosing said scintillation layer growth rate to be no more than 250 μm per hour.

8. The method of claim 1, further comprising the step of choosing said temperature T to lie in the range 100° C.≦T≦250° C.

9. The method of claim 1, further comprising the step of choosing said thickness of said scintillation layer to be no more than 50 d.

10. The method of claim 1, further comprising the step of choosing said lateral width d to be in the range 2–20 μm.

11. A method of producing a detector of X-rays and high energy charged particles with improved spatial resolution, the method comprising the steps of:

providing a substrate layer of material having an electrically conductive surface and containing an etchable material;

etching a predetermined pattern in the conductive surface of the substrate so that the etchable material forms a plurality of projections of lateral width d on the conductive surface of the substrate surface;

forming a scintillation layer, at a growth rate ≦500 μm per hour, at a temperature T in the range 50° C.≦T≦400° C., and of thickness no more than 100 d, of scintillation material that produces light of wavelength λ in the range 0.3 μm≦λ≦0.7 μm in response to receipt of high energy particles thereat;

forming a thin layer of sealant material on an exposed surface of the scintillation layer so that the scintillation layer lies between the substrate layer and the etchable material layer;

forming a conductive layer of electrically conductive material that is at least partly transparent to incident light having a wavelength lying in the range 0.3 μm≦λ≦0.7 μm, adjacent to an exposed surface of the sealant material layer so that the sealant material layer lies between the scintillation layer and the conductive layer;

forming a particle detection layer adjacent to an exposed surface of the conductive layer and containing a-Si:H or a-Ge:H, whereby the scintillation material forms as cylinders or columns, separated by gaps that conform to the predetermined pattern.

12. The method of claim 11, further comprising the step of choosing said scintillation layer material from the class consisting of CsI, KI, RbI, CdS, $Zn_xCd_{1-x}S$, $Gd_2O_2S$, $La_2O_2S$, $Ga_ySe$, $CdWO_3$ and $PbO_z$.

13. The method of claim 11, further comprising the step of choosing said conductive layer material from the class consisting of ITO, TO, Al, Cr, Au, Ag, Pd and Pt.

14. The method of claim 11, further comprising the step of choosing said pattern formation layer material from the class consisting of polyimide, amorphous silicon, crystalline silicon, amorphous germanium and crystalline germanium.

15. The method of claim 14, further comprising the step of choosing said predetermined pattern for said pattern formation layer from the class consisting of a triangle, a quadrilateral, a hexagon, an oval and a linear array pattern.

16. The method of claim 11, further comprising the step of filling said gaps between said columns with a material that is highly absorbing for light of said wavelength $\lambda_0$.

17. The method of claim 11, further comprising the step of choosing said scintillation layer growth rate to be no more than 250 μm per hour.

18. The method of claim 11, further comprising the step of choosing said temperature T to lie in the range 100° C.≦T≦250° C.

19. The method of claim 11, further comprising the step of choosing said thickness of said scintillation layer to be no more than 50 d.

20. The method of claim 11, further comprising the step of choosing said lateral width d to be in the range 2–20 μm.

21. A method of producing a detector of X-rays and high energy charged particles with improved spatial resolution, the method comprising the steps of:

forming a first structural component consisting of a first substrate layer of material and a particle detector layer, containing a-Si:H or a-Ge:H and deposited on an exposed surface of the first substrate layer;

forming a second structural component by:

forming a second substrate layer of material containing an etchable material on an exposed surface;

etching a predetermined pattern in the etchable material of the second substrate layer to form a plurality of ridges or projections, of lateral width d, on an exposed surface of the etchable material; and forming a scintillation layer, at a growth rate ≦500 μm per hour, at a temperature T in the range 50° C.≦T≦400° C., and of thickness no more than 100 d, of scintillation material that produces light having a wavelength λ lying in the range 0.3 μm≦λ≦0.7 μm in response to receipt of high energy particles, so that the scintillation material forms as cylinders or columns, separated by gaps that conform to the predetermined pattern; and bringing the first and second structural components together so that an exposed surface of the particle detection layer is adjacent to an exposed surface of the scintillation layer.

22. The method of claim 21, further comprising the step of providing an optically transparent material, positioned between said scintillation layer and said particle detection layer, to hold said scintillation layer and said particle detector layer together.

23. The method of claim 21, further comprising the step of choosing said scintillation layer material from the class consisting of CsI, KI, RbI, CdS, $Zn_xCd_{1-x}S$, $Gd_2O_2S$, $La_2O_2S$, $Ga_ySe$, $CdWO_3$ and $PbO_2$.

24. The method of claim 21, further comprising the step of choosing said pattern formation layer material from the class consisting of polyimide, amorphous silicon, crystalline silicon, amorphous germanium or crystalline germanium.

25. The method of claim 21, further comprising the step of choosing said predetermined pattern for said pattern formation layer from the class consisting of a triangle, a quadrilateral, a hexagon, an oval and a linear array pattern.

26. The method of claim 21, further comprising the step of filling said gaps between said columns with a material that is highly absorbing for light of said wavelength $\lambda_0$.

27. The method of claim 21, further comprising the step of choosing said scintillation layer growth rate to be no more than 250 μm per hour.

28. The method of claim 21, further comprising the step of choosing said temperature T to lie in the range $100° C. \leq T \leq 250° C$.

29. The method of claim 21, further comprising the step of choosing said thickness of said scintillation layer to be no more than 50 d.

30. The method of claim 21, further comprising the step of choosing said lateral width d to be in the range 2-20 μm.

31. Apparatus for detection of X-rays and high energy charged particles with improved spatial resolution of detection, the apparatus comprising:
a first substrate, having an electrically conductive surface;
a particle detector layer, formed on the conductive surface of the first substrate;
an electrically conductive layer, formed on an exposed surface of the particle detector layer;
a scintillation layer, formed on an exposed surface of the conductive layer as a plurality of columns of luminescent scintillation material that produces light having a wavelength $\lambda$ lying in a range 0.3 $\mu m \leq \lambda \leq 0.7$ μm in response to receipt of high energy particles, with adjacent columns of scintillation material being separated by gaps of maximum lateral width d and the columns of scintillation material having a height no more than 100 d; and
a sealant layer formed over an exposed surface of the scintillation layer, where the gaps between the columns of said luminescent scintillation material conform to a predetermined pattern at the interface between the conductive layer and the scintillation layer, or at the interface between the sealant layer and the scintillation layer.

32. The apparatus of claim 31, wherein said scintillation layer material is drawn from the class consisting of CsI, KI, RbI, CdS, $Zn_xCd_{1-x}S$, $Gd_2O_2S$, $La_2O_2S$, $Ga_ySe$, $CdWO_3$ and $PbO_2$.

33. The apparatus of claim 31, wherein said predetermined pattern is drawn from the class consisting of a triangle, a quadrilateral, a hexagon, an oval and a linear array pattern.

34. The apparatus of claim 31, wherein said height of said columns of said scintillation material is no more than 50 d.

* * * * *